Patented May 23, 1933

1,910,475

UNITED STATES PATENT OFFICE

GUSTAV REDDELIEN, OF LEIPZIG, AND HANS LANGE, OF DESSAU IN ANHALT, GERMANY, ASSIGNORS TO GENERAL ANILINE WORKS, INC., OF NEW YORK, N. Y., A CORPORATION OF DELAWARE

PROCESS OF MANUFACTURING 1'-CHLORO-1-METHYLNAPHTHALENE

No Drawing. Application filed December 23, 1929, Serial No. 416,206, and in Germany January 12, 1929.

Our present invention relates to a new process of manufacturing 1'-chloro-1-methylnaphthalene of the formula

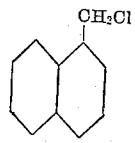

According to our invention, naphthalene is transformed into 1'-chloro-1-methylnaphthalene in simple manner and with a good yield by mixing crystallized naphthalene in an aqueous suspension with a molecular amount of formaldehyde and with concentrated hydrochloric acid and by stirring the mixture while cautiously heating. Preferably, the concentration of acid is maintained at a sufficient degree by simultaneously introducing gaseous hydrogen chloride. Furthermore, we prefer to carry out our new process at a temperature of about 60° C. to about 70° C.; under these conditions yields of more than 60 per cent of the theoretical amount are easily obtained, however, the reaction temperature may be varied within certain limits and good results even are obtained at temperatures between 40 to about 100° C.

The reaction may be illustrated by the following equation:

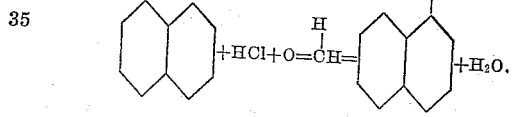

In contradistinction to other known processes we neither use an organic solvent nor a condensing agent nor a polymerized formaldehyde. The 1'-chloro-1-methylnaphthalene is a valuable intermediate product, for instance, in the manufacture of synthetic dyes.

The following example illustrates the invention without limiting it, the parts being by weight:—

Example.—768 parts of pulverized naphthalene are introduced into 750 parts of an aqueous solution of formaldehyde of 30 per cent strength and 3000 parts of concentrated hydrochloric acid. The mixture is heated to about 60° to about 70° C. while stirring and introducing hydrogen chloride. After 10 hours, the oil floating on the surface of the reaction mixture is separated and fractionated under diminished pressure. There are obtained besides 200 parts of recovered naphthalene 649 parts of 1'-chloro-1-methylnaphthalene, that is to say, 61.4 per cent of the theoretical amount or 83.1 per cent calculated upon the naphthalene consumed. The 1'-chloro-1-methylnaphthalene boils at 153° C. under a pressure of 12 mm. mercury, it solidifies in the cold and can be recrystallized from alcohol. It melts at 31° C. to 32° C.

What we claim is:—

1. The process which comprises reacting formaldehyde upon an aqueous suspension of crystallized naphthalene in the presence of concentrated hydrochloric acid in an amount surpassing that required theoretically for the formation of 1'-chloro-1-methylnaphthalene according to the equation:

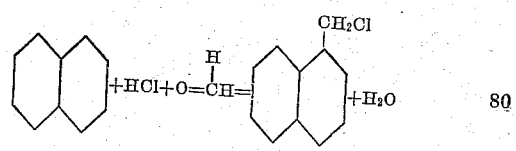

2. The process which comprises reacting formaldehyde upon an aqueous suspension of crystallized naphthalene in the presence of concentrated hydrochloric acid at a temperature of about 40° to about 100° C. while stirring the reacting mixture and while introducing gaseous hydrogen chloride.

3. The process which comprises reacting formaldehyde upon an aqueous suspension of crystallized naphthalene in the presence of concentrated hydrochloric acid at a temperature of about 60° to about 70° C. while stirring the reacting mixture and while introducing gaseous hydrogen chloride.

4. The process which comprises suspending 768 parts of naphthalene in 750 parts of an aqueous solution of formaldehyde of 30 per cent strength and 3000 parts of concentrated hydrochloric acid, heating the mixture to 60° to 70° C. while stirring and introducing hydrogen chloride.

In testimony whereof, we affix our signatures.

GUSTAV REDDELIEN.
HANS LANGE.